United States Patent [19]

Nakanishi

[11] Patent Number: 4,910,060

[45] Date of Patent: Mar. 20, 1990

[54] SHOCK ABSORBING SHEET COMPRISING GELLED MATERIAL

[75] Inventor: Motoyasu Nakanishi, Fujishi, Japan

[73] Assignee: Kabushiki Kaisha Cubic Engineering, Shizuokaken, Japan

[21] Appl. No.: 179,222

[22] Filed: Apr. 8, 1988

Related U.S. Application Data

[62] Division of Ser. No. 105,562, Oct. 8, 1987.

[30] Foreign Application Priority Data

Jan. 31, 1987 [JP] Japan .................................. 62-21254
Mar. 9, 1987 [JP] Japan .................................. 62-34010
May 28, 1987 [JP] Japan .................................. 62-132848

[51] Int. Cl.$^4$ .............................................. B32B 1/04
[52] U.S. Cl. ........................................ 428/72; 428/76; 428/447
[58] Field of Search ............... 5/449, 472; 156/145, 156/196, 206, 209, 219–222, 274.4, 290, 308.4, 308.8, 272.2; 428/45, 68, 70, 71, 72, 156, 158, 161, 172, 178, 180, 218, 446, 448, 451, 76, 447

[56] References Cited

U.S. PATENT DOCUMENTS

| 4,456,642 | 6/1984 | Burgdörfer | 428/76 |
| 4,754,514 | 7/1988 | Limb | 428/76 |
| 4,797,310 | 1/1989 | Barby | 428/76 |

*Primary Examiner*—Merrell C. Cashion, Jr.
*Attorney, Agent, or Firm*—Wenderoth, Lind & Ponack

[57] ABSTRACT

A method for manufacturing a sheet-formed buffer material using a gelled material wherein a thermally flexible and weldable covering sheet is applied to each of both surfaces of a flat gel material layer made of gelled material with penetration value of 50 to 200 and a buffer layer is thus made, said buffer layer being divided from above said covering sheet by a dividing means having a thermally welding means whereby said buffer layer is divided by said dividing means to form separate cells and simultaneously said covering sheets of the divided portions are welded by said thermally welding means to form dividing grooves between separate independent cells.

16 Claims, 8 Drawing Sheets

SHOCK ABSORBING SHEET COMPRISING GELLED MATERIAL

This is a Rule 60 Divisional of Ser. No. 105,562, filed Oct. 8, 1987.

BACKGROUND OF THE INVENTION

The present invention relates to a method for manufacturing a sheet-formed buffer material using gelled material, mainly silicone gel.

A gelled material represented by silicone gel can be expected to serve as a buffer material due to its liquid propagation characteristics as disclosed in the U.S. patent application Ser. No. 814726 filed on Dec. 30, 1985, now abandoned.

Such silicone gel, however, has a penetration value of approximately 50 to 200 which has been measured according to JIS (Japanese Industrial Standard) K 2530-1976—(50 g load) and therefore it has the feature that the adhesiveness of the surface is high and the tensile strength and the surface hardness of this type of gelled material is weak.

To solve this problem, a buffer material using this type of gelled material as a buffer layer is made by covering the whole external surface of gelled material with a cloth or, if the gelled material is silicone gel, the buffer material is made by causing a hardened layer to be formed on its external surface through a chemical reaction.

The conventional buffer material as described above has accompanied problems in that the whole single buffer layer is deformed during absorption of external shock since the buffer layer made of gelled material is made as single layer and, if this buffer material is used in, for example, a shoe sole, the whole buffer layer causes transversal slipping and therefore the buffer layer cannot exhibit a satisfactory buffering performance.

To solve such problems, it is preferable to finely divide the buffer layer made of a buffer material into a number of separate independent cells so that individual independent cells can independently provide a buffering action and therefore the single buffer layer made of gelled material included in the buffer material need be divided into arrays of independent cells.

As such division cannot be realized on the buffer material on which the hardened layer is formed on the surface of gelled material as described above, a sewing means such as quilting should be used for a buffer material using a cloth as an external covering material as described above.

As described above, however, this type of gelled material, particularly, silicone gel with the penetration value of approximately 150, which is the most desirable material, has a high adhesiveness and, if such material is handled by the sewing means, silicone gel which adheres to the sewing needle may lower the processing speed or may be carried away from the external covering sheet to stick to the surface of the external covering sheet or neighboring object.

SUMMARY OF THE INVENTION

An object of the present invention is to provide a method for manufacturing a sheet-formed buffer material with at least two independent cells which contain gelled material with the penetration value of approximately 50 to 200.

This object is achieved by a manufacturing method comprising the steps of making a buffer layer by applying covering sheets made of a thermally weldable material to both surfaces of a flat gel material layer made of gelled material and a process for dividing said buffer layer from above the covering sheet, jointing the front and rear covering sheets at the dividing positions and welding the jointed portions by heating.

Another object of the present invention is to provide the method for manufacturing a buffer material whose shock absorbing ability is improved by overlapping a cushion layer on at least one of said both front and rear covering sheets.

This object can be achieved by overlapping a thermally weldable foamed sheet such as polyvinyl chloride, polyurethane or urethane vinyl to the external or internal surface of one or both of the covering sheets, and dividing the buffer layer.

Another further object of the present invention is to provide the method for manufacturing a buffer material by lamination-forming a thin layer with excellent heat conductivity such as, for example, aluminum on the external surface of at least one of said both front and rear covering sheets by, for example, a method of vacuum evaporation.

Such buffer material as described above can be used at a location such as, for example, engine mount and cooler compressor mount where the material is subject to thermal effects.

Another further object of the present invention is to provide the method for manufacturing a buffer material capable of ensuring division of the buffer layer by pressing the bottoms of grooves of the buffer layer which are formed when the buffer layer is divided.

If the dividing grooves are formed by dividing the buffer layer and separate independent cells are formed by these dividing grooves, the gelled material which stays at the divided groove portions is extruded into independent cell portions and the internal pressure of the independent cells increases.

If the buffer layer is thick, the welded portions of dividing grooves may be separated by the increased internal pressure of independent cells. However such separation can be prevented by pressing the dividing grooves for a while to ensure division of the buffer layer and pressing the dividing grooves until they are cooled even after welding to fix solidification of welded portions.

PREFERRED EMBODIMENT OF THE INVENTION

Figure 1:
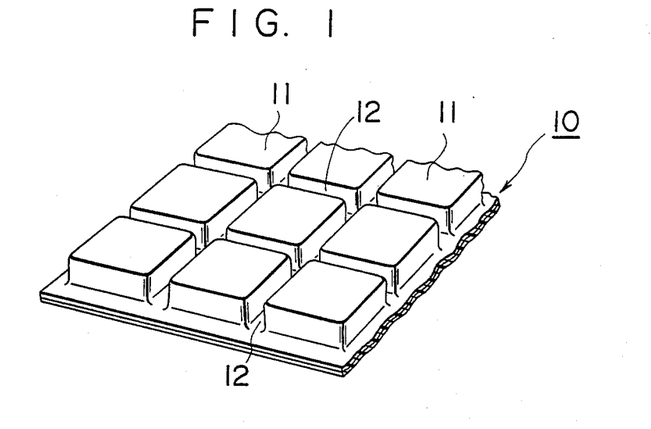
FIG. 1 is a perspective view showing a part of an example of the buffer material manufactured by the method in accordance with the present invention.

Referring to FIG. 1, there is shown buffer material 10 obtained by the method in accordance with the present invention. Buffer material 10 is divided into a number of independent cells 11 each of which is separated by the dividing grooves 12.

The width of said dividing grooves 12 is preset in accordance with the purpose of use of buffer material 10; for example, for a shoe sole, the width of the dividing groove can be set to be large in case where a large inertia acts in the horizontal direction at the time of sudden stopping motion.

Figure 2:
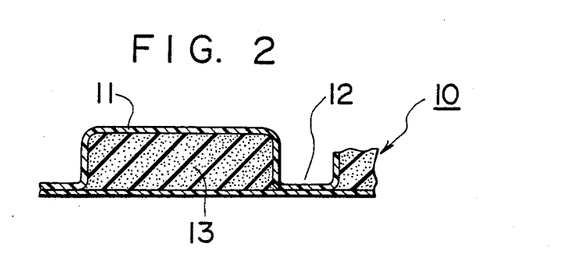
FIG. 2 is a magnified cross sectional view of a principal part of said buffer material.

Each independent cell 11 of said buffer material 10 is filled with a gelled material as shown in FIG. 2 and finely divided buffer layers 13 are thus formed.

Silicone gel with the penetration value of, for example, 50 to 200 is used as this gelled material and Toray Silicone CY 52 (registered trade name of the silicone product of Tray Silicone Kabushiki Kaisha) is suitable as said silicone gel.

The gelled material used for the present invention can be mixed with fine hollow particles such as, for example, Fillite (registered trademark) manufactured by Nippon Fillite Kabushiki Kaisha or Expancel (registered trademark) sold by Nippon Fillite Kabushiki Kaisha to reduce its price and specific gravity or with magnetic particles or conductive particles to provide magnetic characteristics or electrical characteristics.

Silicone gel mixed with fine hollow particles is disclosed in the U.S. patent application Ser. No. 814726 cited in "Background of the Invention", now abandoned.

Figure 3:
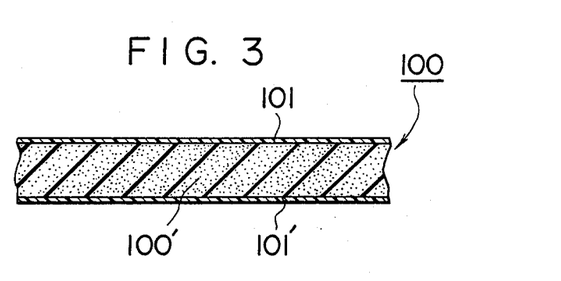
FIG. 3 is a magnified cross sectional view of a principal part of said buffer material in the covering process by the method in accordance with the present invention.
Figure 10:
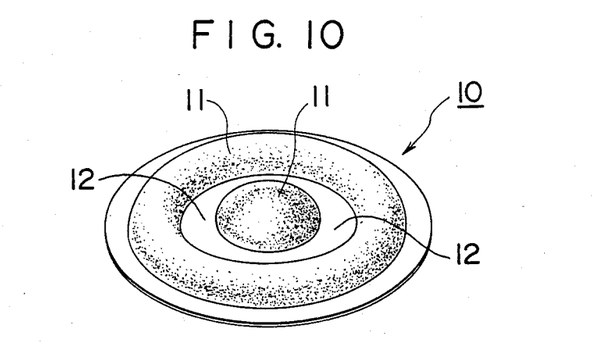

Said independent cells 11 are made as island cells in FIG. 1. However, they can be made to be concentrically multi-annular as shown in FIG. 10 or transversally parallel, depending on the case, and the shape of independent cells can thus be freely selected. FIG. 3 shows the process for making said sheet-formed buffer layer 100 of the method in accordance with the present invention in which the flat sheet-formed gel material layer 100' made of gelled material is covered with covering sheets 101 and 101' on both its front and rear surfaces.

Production of such sheet-formed buffer layer 100 is disclosed in the U.S. patent application Ser. No. 73067 filed on July 13, 1987.

Figure 4A:
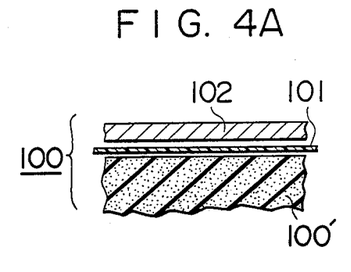
FIGS. 4A and 4B are respectively an explanatory illustration showing another embodiment of said covering process.
Figure 4B:
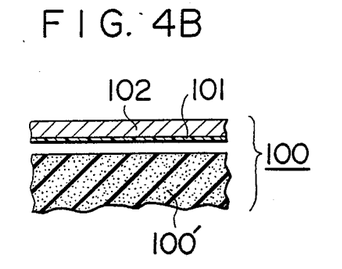

Covering sheets 101 and 101' can serve as the external covering sheets or at least one of covering sheets 101 and 101' can be provided independent of external covering sheet 102 as shown in FIGS. 4A and 4B.

If one or both of covering sheets 101 and 101' serve as the external covering sheet, covering sheets 101 and 101' are made of a thicker thermally weldable film such as, for example, polyvinyl resin or polypropyrene resin but, if covering sheet 101 is not used as the external covering sheet, a thermally weldable film which is the sheet to be welded is applied as covering sheet 101 to the inside of an urethane vinyl film or a foamed sheet used as external covering sheet 102 as shown in FIG. 4A or a thermally weldable adhesive agent is applied to the inside of external covering sheet 102 to form covering sheet 101 as shown in FIG. 4B. In other words, said covering sheet 101 or/and covering sheet 101' can be formed so that they directly come in contact with gel material layer 100' and therefore a means for extending the thermally weldable film or a means for applying the thermally weldable adhesive agent can be used.

And also, a thermally weldable cushion layer can be used as covering sheets 101 and/or 101'. Buffer layer 100 which has been covered in said covering process is divided into independent cells 11 by the dividing process as shown in FIG. 5.

In this dividing process, the heating press method, high frequency welding method or ultrasonic welding method are used, and covering sheets 101 and 101' are adhered through a welding reaction at the same time buffer layer 100 is divided.

Figure 5:
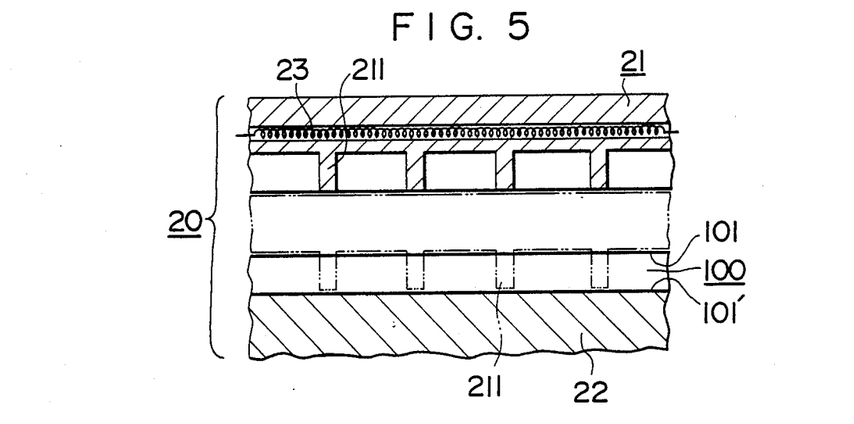
FIG. 5 is an explanatory illustration showing the dividing method included in the method in accordance with the present invention.

FIG. 5 shows an embodiment according to the heating press method, where upper mold 21 of molding unit 20 is provided with pressure-dividing members 211 which are protruded in the form of the grating and one or both of upper mold 21 and lower mold 22 are provided with a heating means such as, for example, heater 23.

Said pressure-dividing members 211 serve to divide buffer layer 100 between upper and lower molds while being heated by said heater 23 and, at the same time, form weld dividing grooves 12 to make the sheet-formed buffer material 10 as shown in FIG. 1.

Since there are some problems with this heating press method in cooling dividing grooves 12 and controlling the temperature for heating the mold, it is actually preferable to adopt the ultrasonic welding method and the known means can be used for this method.

In the above discussion the covering process and the dividing process have been described as separate processes for convenience in explanation. Actually, in the dividing process, covering sheets 101 and 101' can be overlapped onto gel material layer 100'.

Figure 6:
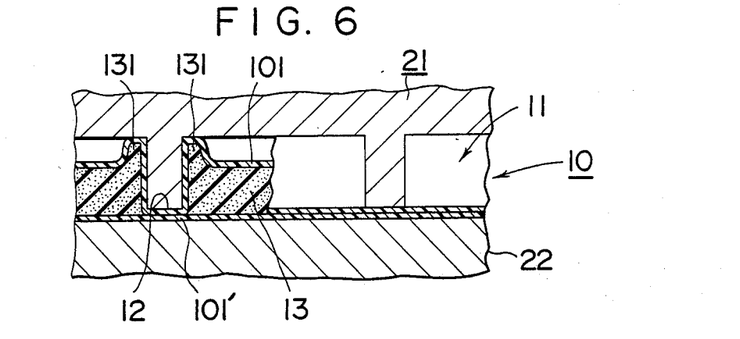
FIG. 6 is an explanatory illustration showing the status of independent cells in said dividing process.

In said dividing process, as shown in FIG. 6, bulge 131 as large as an extruded amount of gelled material due to formation of dividing groove 12, is formed at the periphery of divided buffer layer 13 inside independent cell 11 and therefore, for dividing groove 12 with a larger capacity, external covering sheet 102 and covering sheets 101 and 101' need be made of a highly extendable and elastic material.

Figure 7A:
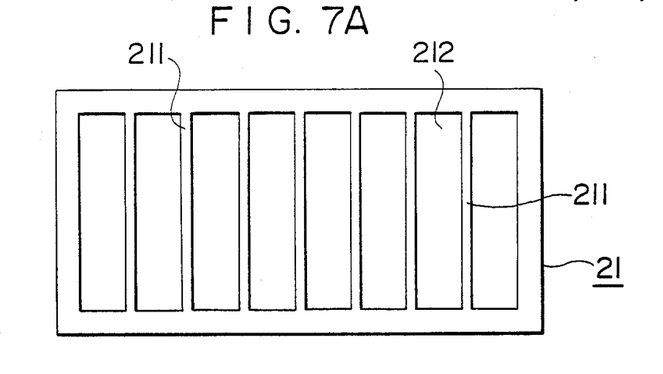
FIGS. 7A to 7C are respectively a bottom view of an example mold for use in the method in accordance with the present invention.
Figure 7B:
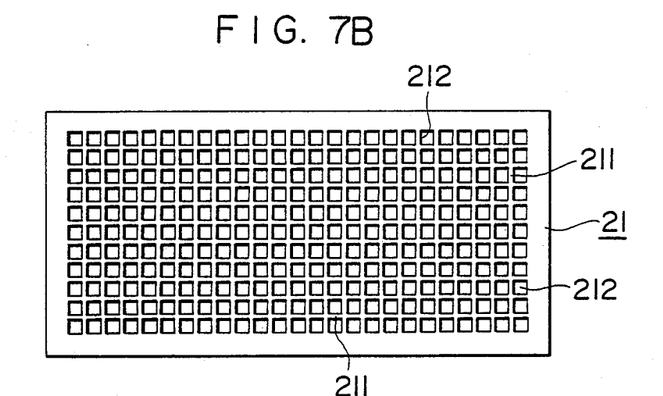
Figure 7C:
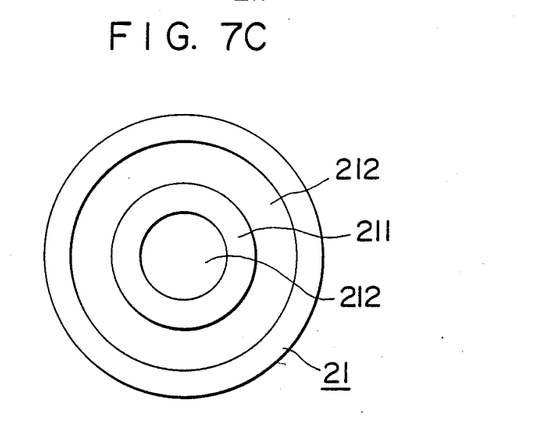

An example of the mold for use in the method in accordance with the present invention is shown in FIGS. 7A and 7C.

Mold 21 shown in FIG. 7A is constructed by providing a number of protruded pressure-dividing members 211 in parallel arrangement to form long rectangular cavities 212 also in parallel arrangement, and the sheet-formed buffer material 10 on which a number of slender independent cells 11 are formed in parallel can be made by using this mold 21.

Figure 8:
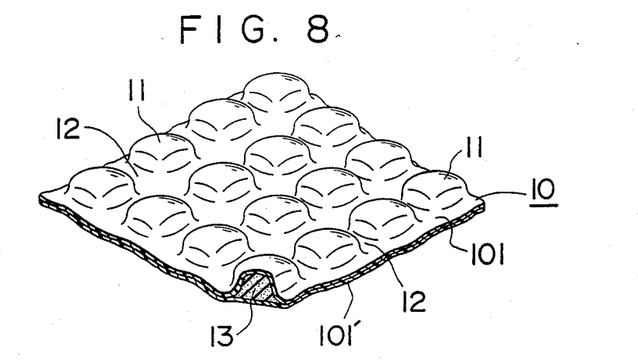
FIGS. 8 to 11 are respectively a perspective view of a part of other examples of the buffer material made by the method in accordance with the present invention.
Figure 9:
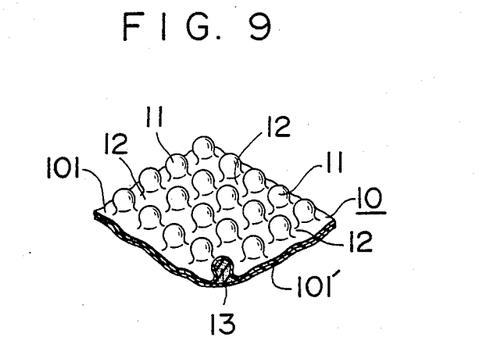

Mold 21 shown in FIG. 7B is constructed by providing pressure-dividing members 211 in a grating pattern to have a number of circular cavities 212 and the sheet-formed buffer material 10 with the arrays of separate independent cells 11 as shown in FIGS. 1, 8 and 9 can be made with this mold.

Mold 21 shown in FIG. 7C has cavities 212 which are concentrically provided and pressure-dividing member 211 and normally circular cavity 212 is provided at the center of mold 21. The use of this mold 21 allows making of buffer material 10 as shown in FIG. 10.

Though the cavity 212 of said mold 21 shown in FIGS. 7A and 7B is formed to be rectangular in the embodiment, it can be formed to be circular or polygonal or as otherwise desired and can be made in different sizes.

The size of cavity 212 has an important significance in relation to the height of independent cell 11.

This is because, when mold 21 depresses buffer layer 100, the gelled material in a part of buffer layer 100 where dividing groove 12 is formed is extruded into independent cell 11 by pressure-dividing member 211 and the density of the gelled material inside independent cell 11 becomes large.

In this case, if independent cell 11 has large capacity and the penetration value of gelled material is low, bulge 131 as shown in FIG. 6 is formed at independent cell 11 as shown in FIG. 6. If the independent cell 11 is a square each side of which is, for example, 10 mm or less, the independent cell 11 is formed with a bulged top as shown in FIG. 8 and, if each side of independent cell 11 is reduced to approximately 2 to 5 mm, the tops of independent cells 11 are projected as shown in FIG. 9.

Accordingly, if independent cells 11 as shown in FIG. 9 are provided, high independent cells 11 with an excellent buffering effect can be made with thin buffer layer 100 and thus the quantity and cost of gelled material to be used for buffer layer 100 which is a component material can be reduced.

From this fact, it is known that it is better to provide a number of small-diameter cavities 212 in a high density on mold 21 and thus to increase the quantity of gelled material to be stored in independent cell 11 in reference to the capacity of independent cell 11 when forming dividing grooves 12 for obtaining a substantially thick sheet-formed buffer material.

Figure 11:
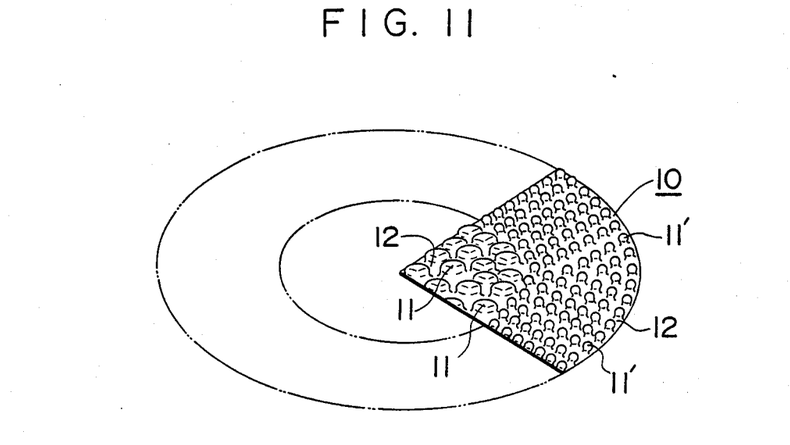
Figure 12:
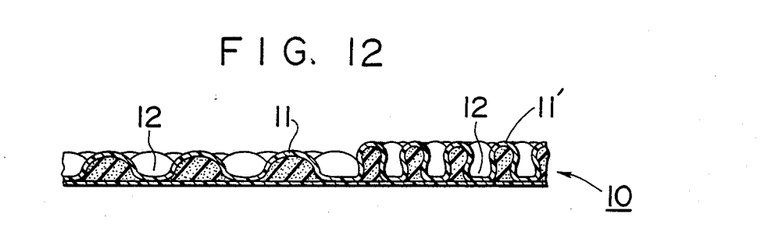
FIG. 12 is a magnified cross sectional view of a principal part of the buffer material shown in FIG. 11.

Since the bulging height of independent cell 11 can thus be varied in accordance with its size, buffer material 10 on which independent cell 11 at the center are made to be low and independent cells 11' at the periphery are made to be high, for example, as shown in FIGS. 11 and 12 can be made and it can be used in sports goods such as knee supporter. In this case, the number and width of dividing grooves 12 can be designed so that buffer material 10 can easily be bent along the contour of a human body which will wear it.

In the method in accordance with the present invention, after sheet-formed buffer material 10 has been made by dividing buffer layer 100, thin film layer 30 with rest preventiveness and thermal conductivity can be applied to this buffer material 10 by a means such as, for example, vacuum evaporation, ion plating, sputtering, non-electrolytic plating and metallic flame coating.

Figure 13:
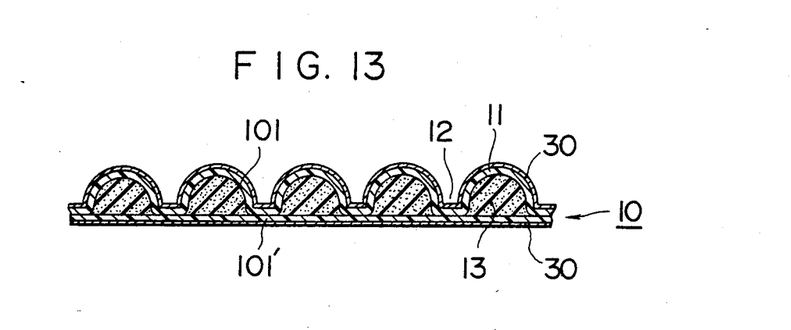
FIG. 13 is a magnified cross sectional view of a principal part showing another embodiment of said buffer material.

FIG. 13 shows the buffer material 10 onto which aluminum is evaporation-deposited as said thin film layer 30 and this buffer material 10 can use independent cells 11 as radiating members.

In case of dividing buffer layer 100 shown in FIG. 5 into independent cells 11 each of which has a relatively large area by the method in accordance with the present invention described above, an excessive increase of the internal pressure of independent cell 11 due to acceptance of gelled material owing to formation of dividing groove 12 is avoided since the quantity of gelled material which is forced into independent cells 11 along with formation of dividing groove 12 is relatively small compared with the capacity of independent cell 11. Also in this case, if the penetration value of gelled material is small, bulge 131 is formed at the periphery of independent cell 11 as shown in FIG. 6 and therefore the gelled material will not be concentrated at the central portion of independent cell 11. However, if the area of independent cell 11 to be formed on buffer layer 100 is less than 1 $cm^2$, the quantity of gelled material which is forced into independent cell 11 along with formation of dividing groove 12 increases compared with the capacity of independent cell 11 whereby a problem is expected in that the thermally welded portions of both covering sheets 101 and 101' are often exfoliated due to the increased internal pressure of independent cell 11.

Such sheet-formed buffer material provided with small independent cells 11 can find a number of practical applications since its buffering effect can be improved by bulging independent cells 11 so as to have a large height as shown in FIG. 9 and the quantity of gelled material to be used can be reduced by increasing the area of dividing groove 12 to the whole buffer material 10.

The processes as shown in FIGS. 14A to 14D are advantageous for provision of such independent cells 11 with large expandability.

Buffer layer 100 to be produced by the method of this embodiment is assumed in the case that the quantity of gelled material to be forced into independent cells 11 by formation of dividing grooves 12 is large in reference to the capacity of independent cells 11, including the case that the thickness of buffer layer 100 is large, and it is not always limited to the case that the width of dividing groove 12 is large.

Figure 14A:
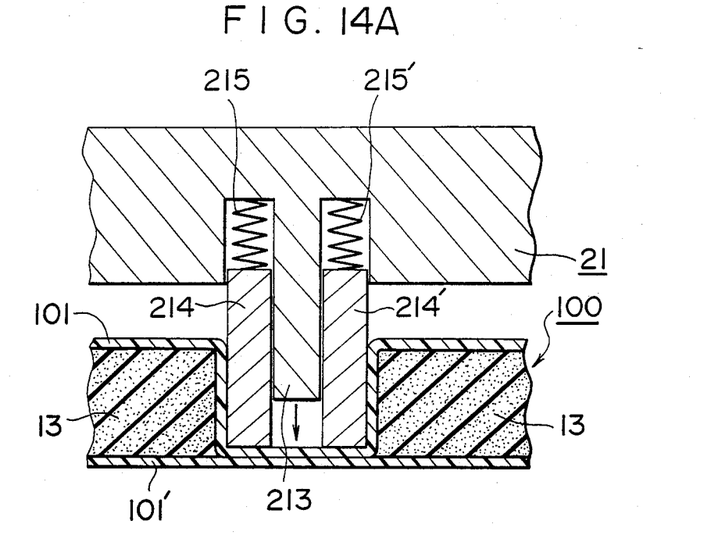
FIGS. 14A to 14D are respectively an explanatory illustration showing the steps of the processes in another embodiment of the method in accordance with the present invention.

In this embodiment, heating type dividing member 213 is assembled with depressing members 214 and 214' at its both sides and these 1-inch wide depressing members 214 and 214' are set to be depressed against buffer layer 100 before dividing member 213 so that covering sheets 101 and 101' are joined as shown in FIG. 14A.

Figure 14B:
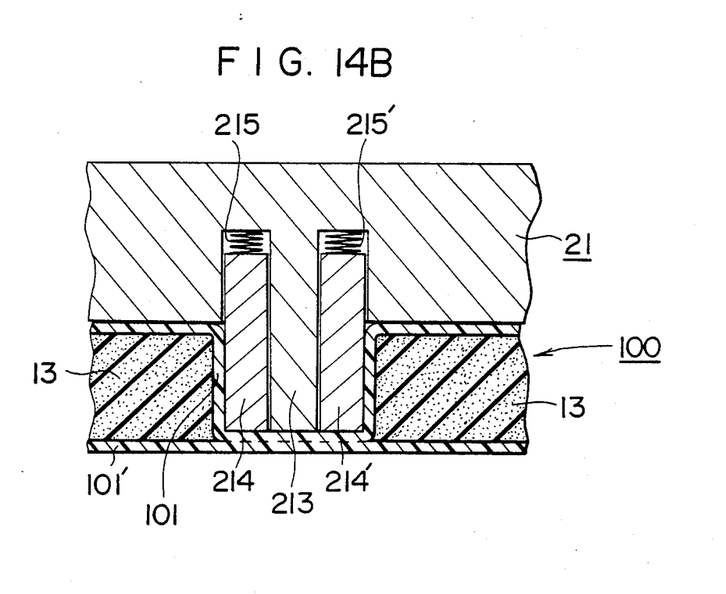

After the grooves thus have been forcibly formed at the expected portions of the dividing grooves on buffer layer 100, dividing member 213 comes into the cavities as shown in FIG. 14B and the joined portions of covering sheets 101 and 101' are welded by, for example, high frequency heating.

Figure 14C:
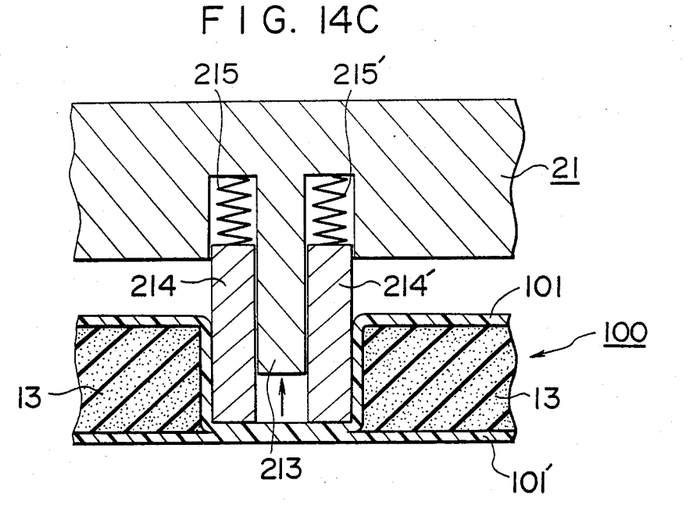
Figure 14D:
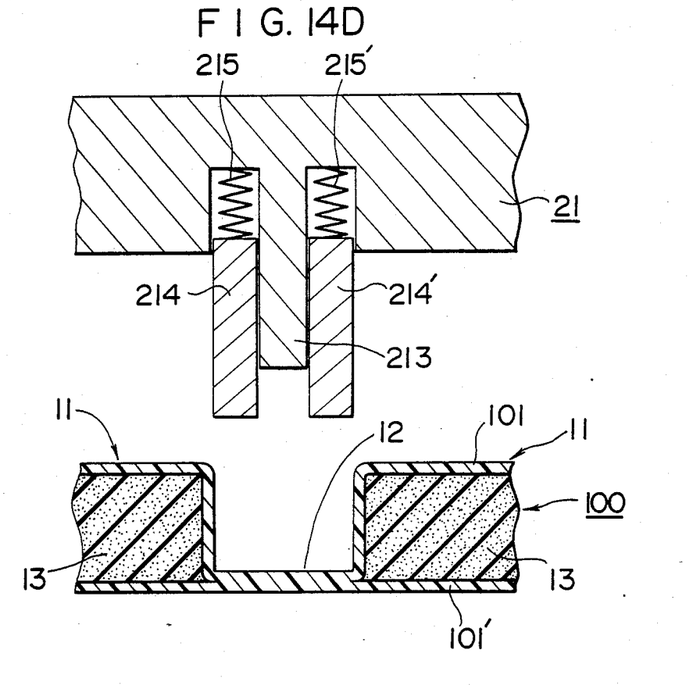

Dividing member 213 rises to return to the home position as shown in FIG. 14C before said depressing members 214 and 214', and subsequently, depressing members 214 and 214' rise to return to the home positions along with rising motion of mold 21 as shown in FIG. 13D after the welded bottom of dividing groove 12 has fully been cooled.

In this embodiment, recessions are formed in advance by said depressing members 214 and 214' at the parts where provision of the dividing grooves is expected and the gelled material is transferred into independent cells 11 due to formation of the recessions by the depressing force of depressing members 214 and 214'.

Said dividing member 213 is forced into the recessions formed by said depressing members 214 and 214' and the shape of which is maintained and the bottom of the recessions is thermally welded by dividing member 213. The bottoms of recessions are firmly held by depressing members 214 and 214' at this time of welding the force which acts to exfoliate covering sheets 101 and 101' along with the increase of the internal pressure of independent cells 11 will not be applied to the bottoms of recessions which will form the bottom of dividing groove 12. Accordingly, the covering layers are positively heated and welded by dividing member 213. The bottom of said dividing groove 12, that is, the bottom of said recession is released from said depressing members 214 and 214' after it has fully been cooled or completely welding-adhered and therefore the covering sheets 101 and 101' will not be exfoliated even though the force due to the increase of internal pressure of independent cells 11 is applied to the bottom of groove 12.

In the embodiment, said depressing members 214 and 214' are provided with differential means such as, for example, springs 215 and 215' to obtain a differential motion for dividing member 213, and depressing members 214 and 214' are designed so that they move prior to dividing member 213 when mold 21 is lowered and move after dividing member 213 when mold 21 is raised.

Figure 15:
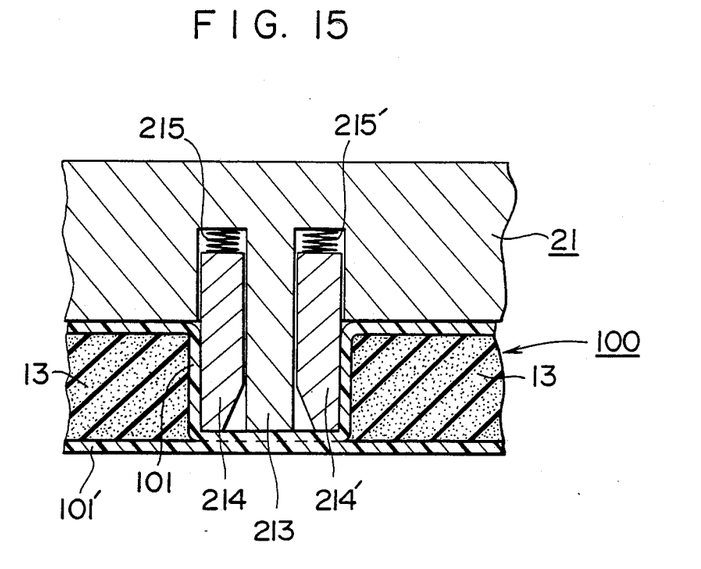
FIG. 15 is a cross sectional view showing another embodiment of the pressure-dividing member shown in FIG. 14A.

Said depressing members 214 and 214' can be constructed so that a strong force acts on the corners of the recession by dividing the inside parts of the extreme ends of depressing members 214 and 214' as shown in FIG. 15.

In said embodiment, the construction of the mold for which dividing member 213 is provided with depressing members 214 and 214' is shown. A similar effect to the above can be achieved by controlling the heating motion of dividing member 213 without using the depressing members. In other words, after dividing member 213 has been fully pushed into buffer layer 100 and said buffer layer 100 has been fully divided, dividing member 213 can be heated to welding-adhere covering sheets 101 and 101', then the welding-adhered bottom of dividing groove 12 can be cooled by cooling dividing member 213 which remains as is and dividing member 213 can be raised to return to the home position after cooling.

Said mold 21 is preferably provided with a dividing edge at its periphery to carry out trimming of the welded peripheral edges of covering sheets of buffer layer 100 when the buffer layer is to be divided. Thus, the periphery of the sheet-formed buffer material which is a product can be shaped at the same time as forming.

The present invention is not limited to the embodiments described above and available in various variations within the range which does not deviate from the claims and the spirit of the present invention.

What is claimed is:

1. A shock absorbing sheet material comprising silicone gel, produced by a method comprising the steps of:
   a. forming an assembly comprising a flat sheet-shaped gel layer made of silicone gel with a penetration value of about 50 to 200, having on each side thereof a flexible covering film having thermal weldability at least on the side which faces said gel layer,
   b. depressing said assembly from the outside of at least one of said covering films by a dividing means including a heating means therefor, to divide said gel material layer by pushing the gel material laterally away from the dividing means, while forcing at least a portion of said covering films on either side of said gel material layer to directly contact each other, thereby simultaneously forming at least two independent cells which are thus divided and are substantially swelled by pushing said silicone gel material therein,
   c. heating said portions where said upper and lower covering films directly contact each other by said dividing means which is heated by said heating means, to weld the internal surfaces of said covering films, to form a line of dividing grooves which define said cells, and
   d. releasing and removing the resultant shock absorbing sheet material in which said dividing grooves are formed, from the dividing means after said heating and welding.

2. The sheet material in accordance with claim 1 wherein said dividing means forms island type independent cells in said sheet material.

3. The sheet material in accordance with claim 2, wherein said dividing means forms island type independent cells having diameters of approximately 2 mm to 10 mm on said buffer layer.

4. The sheet material in accordance with claim 2, wherein said dividing means forms at least two kinds of island type independent cells having different areas on said sheet material.

5. The sheet material in accordance with claim 1, wherein said dividing means forms striped independent cells on said sheet material.

6. The sheet material in accordance with claim 1, wherein said sheet material forms concentrically annular independent cells on said dividing means.

7. The sheet material in accordance with claim 1, wherein said covering film has a non-thermally weldable external covering layer on its external surface.

8. The sheet material in accordance with claim 1, wherein said covering film has a thin metallic film on the outer surface thereof.

9. The sheet material in accordance with claim 8, wherein said thin metallic film is formed after said sheet material has been removed from said dividing means.

10. The sheet material in accordance with claim 7, wherein said covering film is a cushion layer.

11. The sheet material in accordance with claim 7, wherein said covering film has a thermally weldable adhesive agent applied to the internal surface thereof.

12. The sheet material in accordance with claim 1, wherein said gelled material contains hollow particles.

13. The sheet material in accordance with claim 1, wherein said gelled material contains magnetic particles.

14. The sheet material in accordance with claim 1, wherein said gelled material contains many conductive particles.

15. The sheet material in accordance with claim 1, wherein at least one of said covering films which are respectively applied to both surfaces of said gel material layer is made of an expandable film.

16. The sheet material in accordance with claim 15, wherein said covering sheet is made of an elastic film.

* * * * *